US011085516B2

(12) United States Patent
Chen et al.

(10) Patent No.: US 11,085,516 B2
(45) Date of Patent: Aug. 10, 2021

(54) METHODS AND SYSTEM FOR OPERATING A TORQUE VECTORING ELECTRIC MACHINE

(71) Applicant: Ford Global Technologies, LLC, Dearborn, MI (US)

(72) Inventors: Weitian Chen, Windsor (CA); Paul Moubarak, Redford Township, MI (US); Joseph Torres, Dearborn, MI (US); Zhengyu Dai, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 16/133,067

(22) Filed: Sep. 17, 2018

(65) Prior Publication Data

US 2020/0088281 A1 Mar. 19, 2020

(51) Int. Cl.
*B60K 1/02* (2006.01)
*F16H 37/08* (2006.01)
(Continued)

(52) U.S. Cl.
CPC ............ *F16H 37/082* (2013.01); *B60K 1/02* (2013.01); *B60K 17/35* (2013.01); *B60K 17/356* (2013.01); *F16H 48/06* (2013.01); *F16H 57/037* (2013.01); *F16H 63/304* (2013.01); *B60K 2001/001* (2013.01); *B60Y 2300/82* (2013.01); *B60Y 2400/804* (2013.01); *F16H 2048/02* (2013.01); *F16H 2048/364* (2013.01)

(58) Field of Classification Search
CPC .... F16H 37/082; F16H 63/304; F16H 57/037; F16H 48/06; F16H 2048/02; F16H 2048/364; F16H 57/0006; F16H 2057/0012; F16H 48/36; B60K 1/02; B60K 17/35; B60K 15/356; B60K 2001/001; B60K 2023/043; B60K 23/04; B60Y 2300/82; B60Y 2400/804; B60L 15/20; B60L 15/32; B60L 2240/423; B60L 2240/421; B60L 2220/42
See application file for complete search history.

(56) References Cited

U.S. PATENT DOCUMENTS 7,175,557 B2 2/2007 Kirkwood et al.
8,012,057 B2 9/2011 Meixner
(Continued)

OTHER PUBLICATIONS

Kasinathan, D. et al., "An Optimal Torque Vectoring Control for Vehicle Applications via Real-Time Constraints," IEEE Transactions on Vehicular Technology, vol. 65, No. 6, Jun. 2016, 11 pages.
(Continued)

*Primary Examiner* — David J Hlavka
(74) *Attorney, Agent, or Firm* — David Kelley; McCoy Russell LLP (57) ABSTRACT

Methods and systems are provided for operating a vehicle that includes a torque vectoring electric machine. In one example, torque output of a torque vectoring electric machine is adjusted to reduce driveline torque disturbances when the torque vectoring electric machine is activated. The torque output is adjusted in response to a speed difference between a wheel speed and a speed of the torque vectoring electric machine.

15 Claims, 6 Drawing Sheets

(51) Int. Cl.
  *B60K 17/35* (2006.01)
  *B60K 17/356* (2006.01)
  *F16H 63/30* (2006.01)
  *F16H 57/037* (2012.01)
  *F16H 48/06* (2006.01)
  *F16H 48/00* (2012.01)
  *F16H 48/36* (2012.01)
  *B60K 1/00* (2006.01)

(56) References Cited

U.S. PATENT DOCUMENTS

| | | | |
|---|---|---|---|
| 9,593,754 B2 | 3/2017 | Sten | |
| 9,689,485 B1 | 6/2017 | Zhao et al. | |
| 2012/0083378 A1* | 4/2012 | Severinsson | F16H 48/30 |
| | | | 475/150 |
| 2014/0162842 A1 | 6/2014 | Severinsson et al. | |
| 2015/0337937 A1* | 11/2015 | Rodriguez | B60K 17/046 |
| | | | 475/5 |
| 2016/0153537 A1* | 6/2016 | Kubo | F16H 48/36 |
| | | | 475/150 |
| 2016/0236589 A1 | 8/2016 | Sikand et al. | |
| 2017/0227104 A1 | 8/2017 | Isono et al. | |
| 2017/0241532 A1 | 8/2017 | Isono et al. | |
| 2017/0328461 A1* | 11/2017 | Nasu | F16H 57/12 |
| 2018/0345949 A1* | 12/2018 | Holmes | F16H 61/702 |

OTHER PUBLICATIONS

Chen Y. et al., "Design and Analysis of a New Torque Vectoring System with a Ravigneaux Gearset for Vehicle Applications," Energies, vol. 10, No. 12, Dec. 17, 2017, 16 pages.

Mondek, M., "Active torque vectoring systems for electric drive vehicles," Master Thesis, Czech Technical University in Prague, Department of Control Engineering, Jan. 2018, 82 pages.

* cited by examiner

METHODS AND SYSTEM FOR OPERATING A TORQUE VECTORING ELECTRIC MACHINE

FIELD

The present description relates generally to methods and systems for controlling torque distribution between wheels of a vehicle. The methods and systems may be particularly useful for vehicles that are electrically propelled.

BACKGROUND/SUMMARY

A vehicle may include an electric machine to transfer torque from one wheel of an axle to the other wheel of the axle. In particular, a torque vectoring machine may be activated to rotate a gear in a planetary gear set or in a differential so that torque from an electric propulsion machine is transferred from the one wheel to the other wheel. By transferring torque from the one wheel to the other wheel, a larger fraction of torque supplied to the vehicle's wheels may be used to propel the vehicle. However, resonance vibrations may occur as a result of compliance in the axles and gearing between the torque vectoring electric machine and the axles when the electric machine is activated to rotate gears of a planetary gear set or a differential. The resonance vibrations may increase noise and vibrations within the vehicle driveline or axle system. Consequently, the benefits of torque vectoring may be outweighed by increased driveline noise and vibration. Therefore, it may be desirable to provide a way of vectoring torque from one wheel of an axle to the other wheel of the axle such that little resonance vibration is generated.

The inventors herein have recognized the above-mentioned issues and have developed a vehicle operating method, comprising: adjusting torque output of a torque vectoring electric machine via a controller in according to a speed difference between an actual wheel speed and a speed of the torque vectoring electric machine.

By adjusting a torque output of a torque vectoring electric machine according to a speed difference between an actual wheel speed and a speed of the torque vectoring electric machine, it may be possible to provide the technical result of reducing vehicle wheel slip and driveline resonance vibrations. In particular, torque output of the torque vectoring electric machine may be adjusted to reduce speed differences between the torque vectoring electric machine and speed of a wheel. In one example, torque output of the torque vectoring electric machine is adjusted responsive to a speed difference between the torque vectoring electric machine and a left wheel of an axle. The torque output of the torque vectoring electric machine is also adjusted responsive to a speed difference between the torque vectoring electric machine and a right wheel of the axle. The torque adjustments to the torque vectoring machine may reduce resonance vibrations in the driveline and axle.

The present description may provide several advantages. In particular, the approach may reduce resonance vibrations in a driveline axle. Further, the approach may be realized without installing mechanical dampeners. In addition, the approach may be simultaneously applied to reduce noise and vibrations of two half shafts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
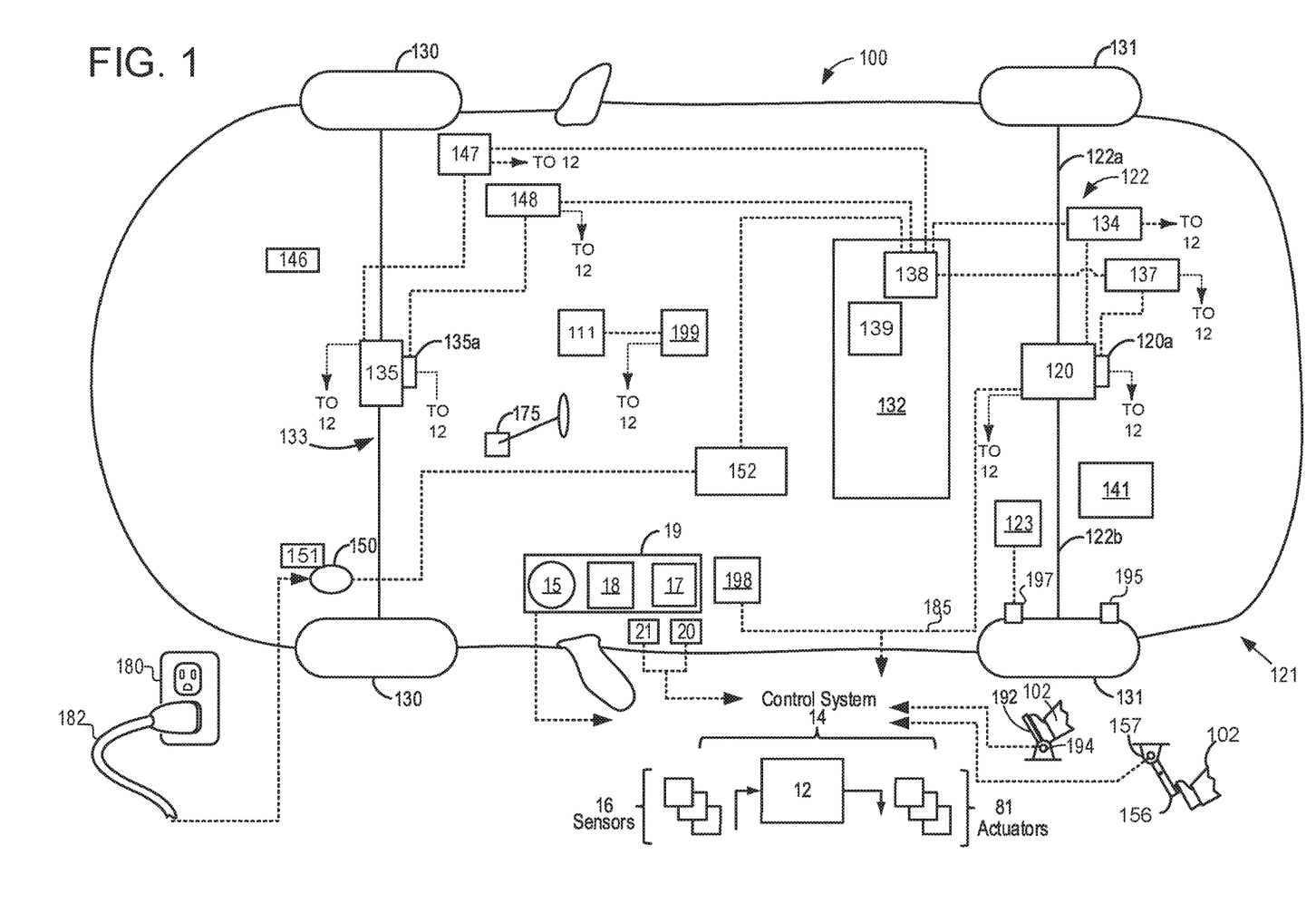
FIG. 1 is a schematic diagram of a vehicle driveline.
Figure 2:
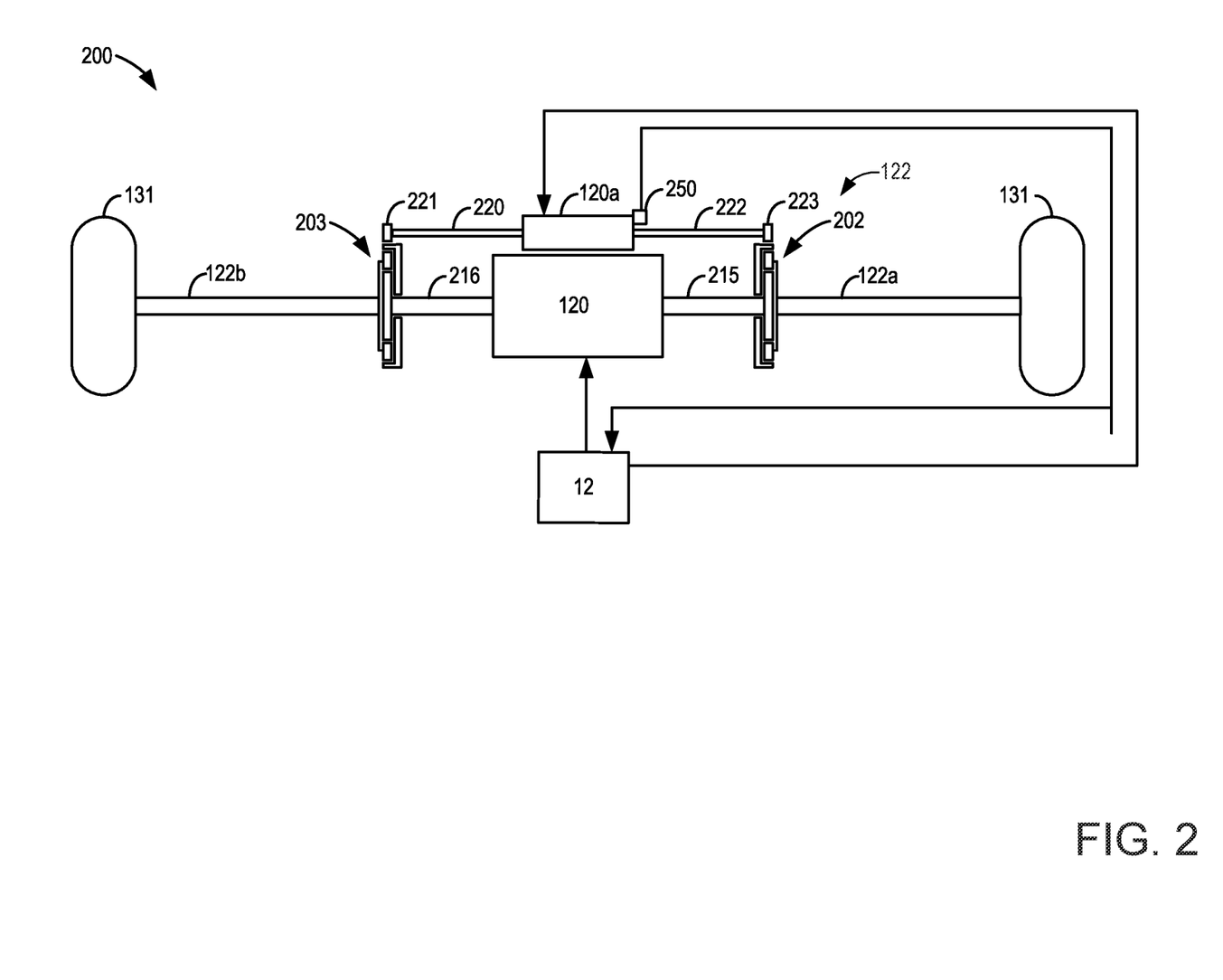
FIG. 2 is a detailed view of an axle that includes a propulsive force electric machine, a torque vectoring electric machine, and gear sets.
Figure 3:
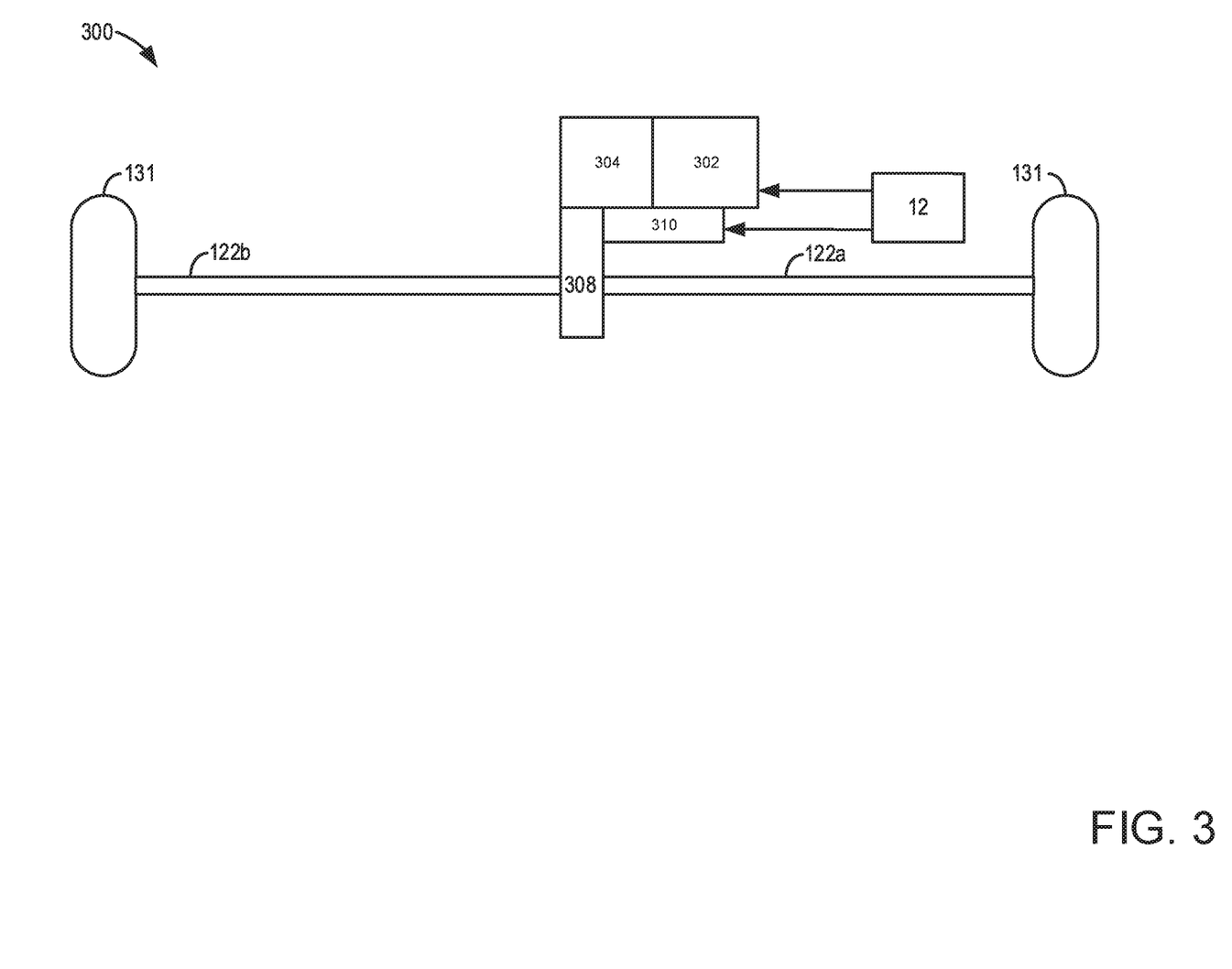
FIG. 3 is a detailed view of a driveline that includes an engine, transmission, a propulsive force electric machine, a differential and an axle, a torque vectoring electric machine, and gear sets.
Figure 4:
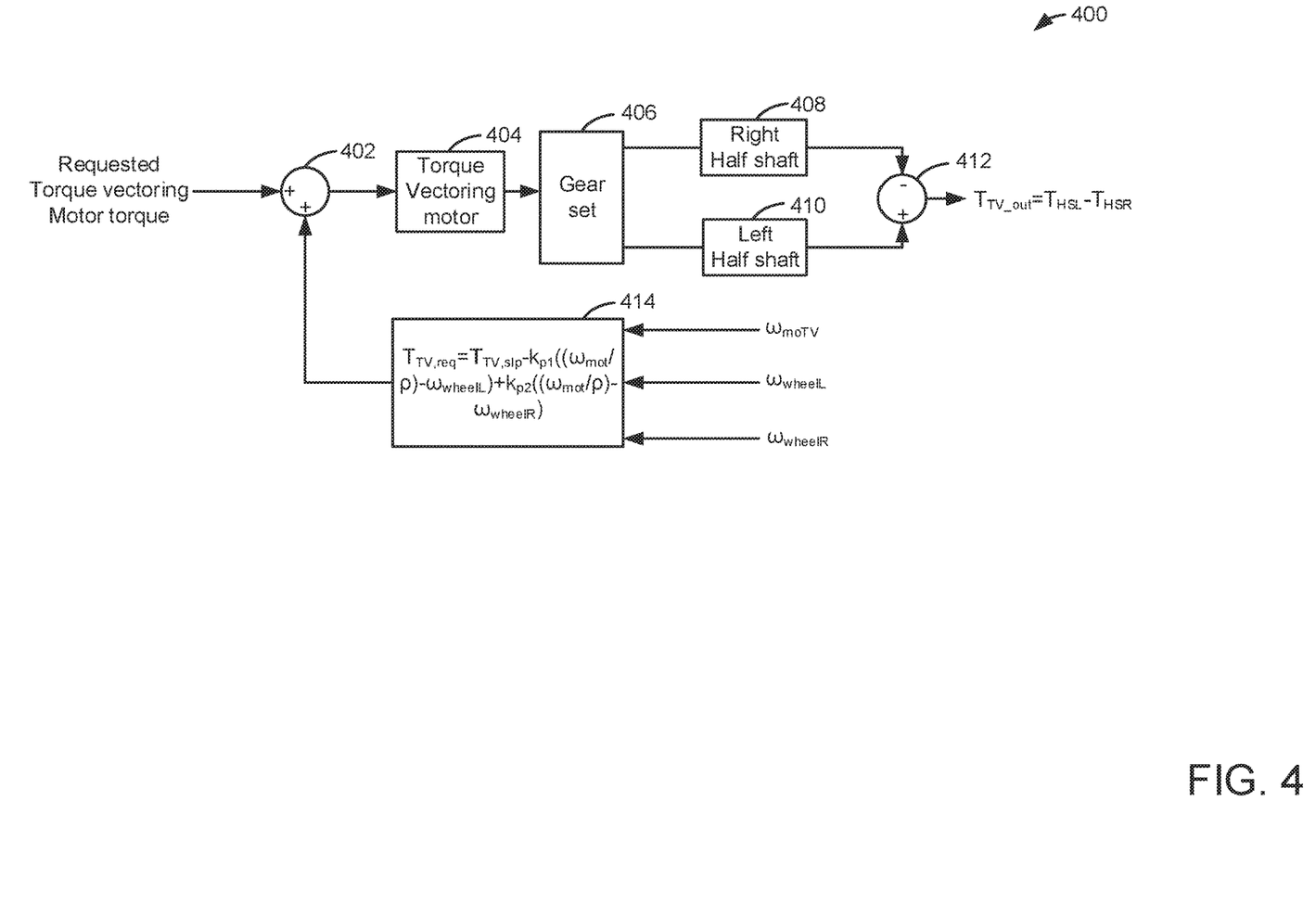
FIG. 4 shows a block diagram for a torque vectoring electric machine controller.
Figure 5:
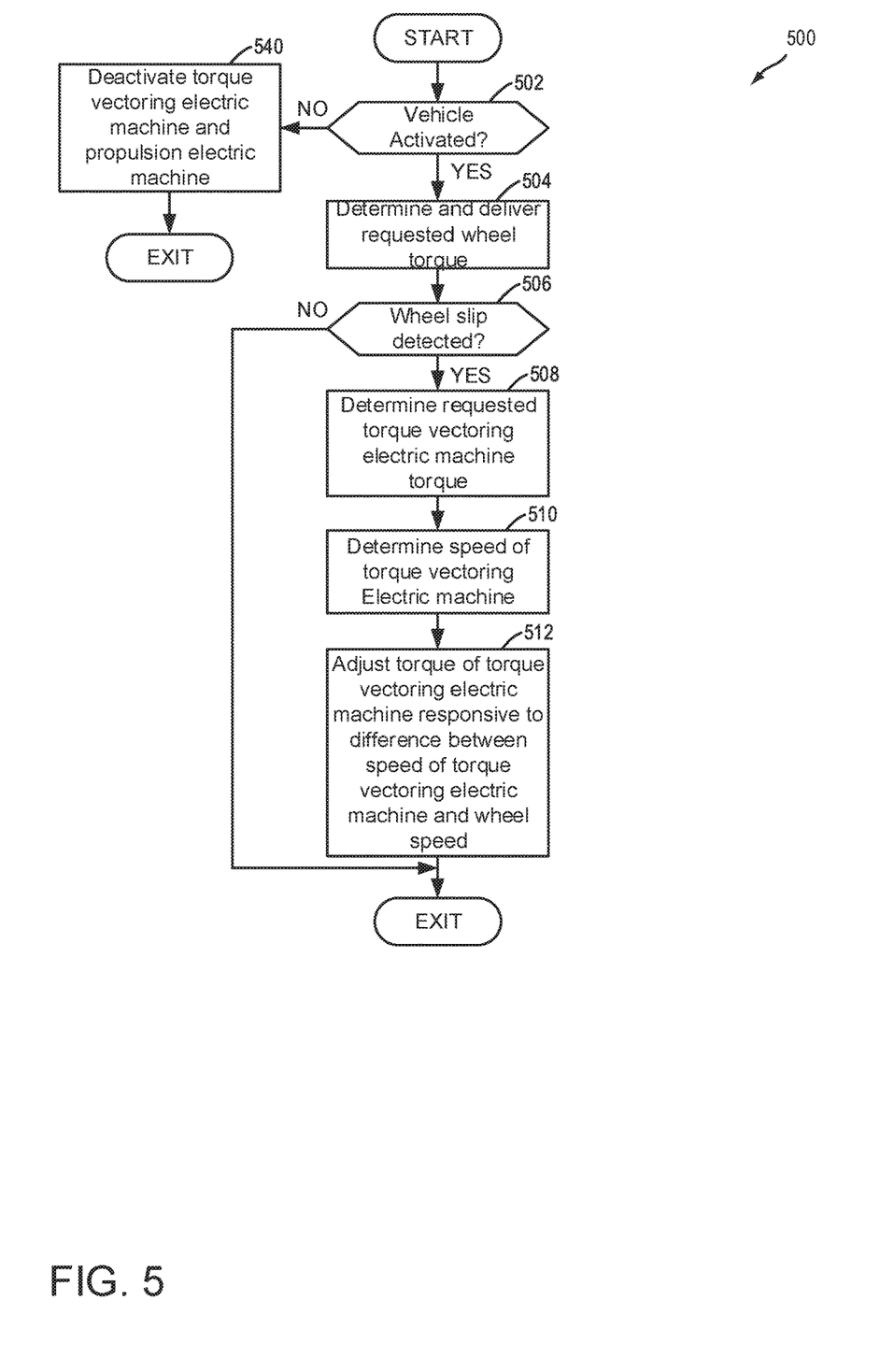
FIG. 5 is a flowchart of a method for controlling a torque vectoring electric machine.
Figure 6:
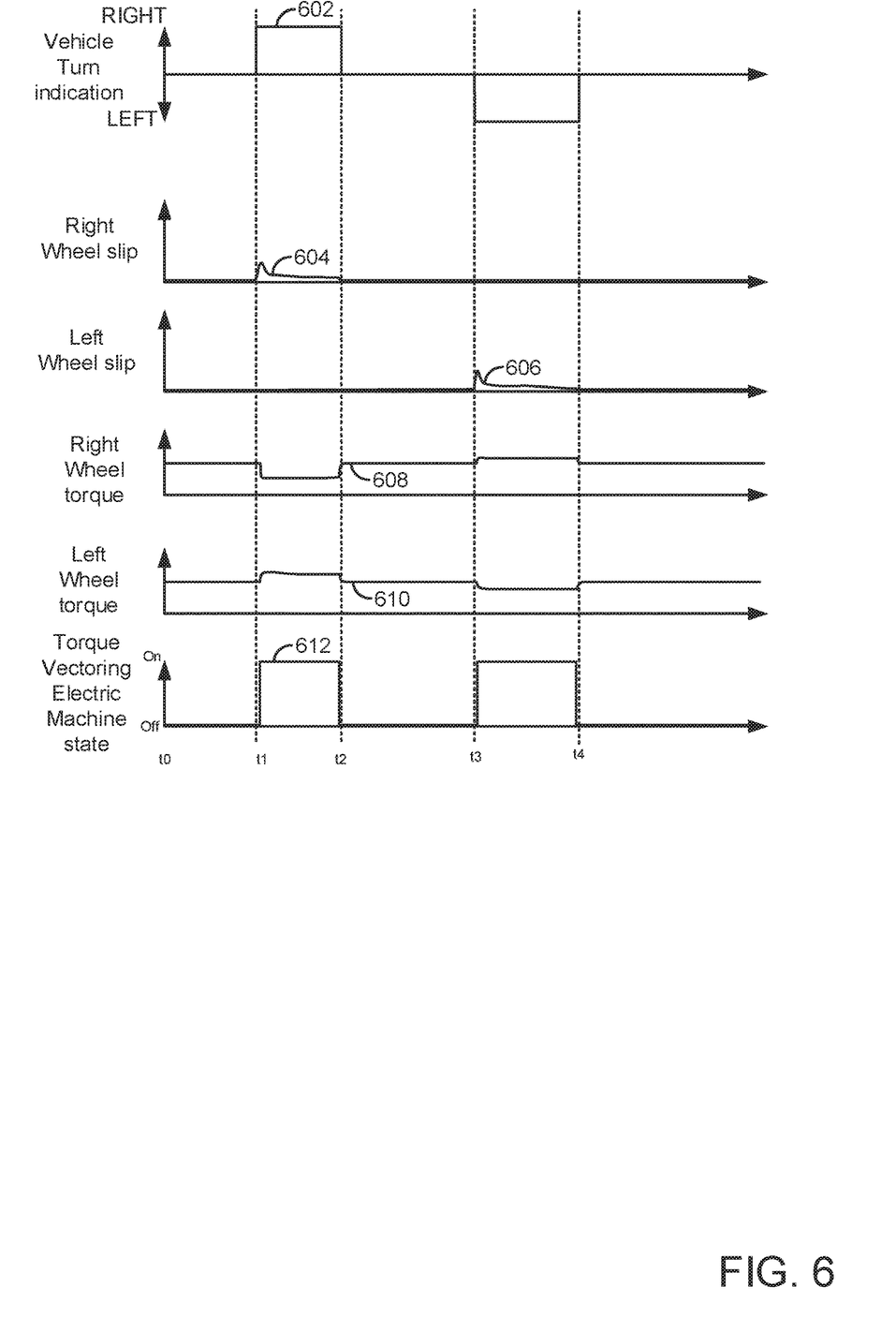
FIG. 6 is a prophetic vehicle operating sequence according to the method of FIG. 5.

The following description relates to systems and methods for operating a vehicle. FIG. 1 shows an example vehicle system that includes a driveline with one or more electrical propulsion sources. A detailed view of an axle system of the vehicle of FIG. 1 is shown in FIG. 2. A second example driveline is shown in FIG. 3. A torque vectoring electric machine control block diagram is shown in FIG. 4. A method for controlling a torque vectoring electric machine is shown in FIG. 5. An example vehicle operating sequence to control a torque vectoring electric machine according to the method of FIG. 5 is shown in FIG. 6.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. Electric machine 120 and electric machine 135 are controlled via controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12. In some examples, the vehicle propulsion system 100 may include an internal combustion engine (not shown).

Vehicle propulsion system 100 has a front axle 133 and a rear axle 122. In some examples, rear axle may comprise two half shafts, for example first half shaft 122a (e.g., a right half shaft), and second half shaft 122b (e.g., a left half shaft). Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into axle 122 and electric machine 135 is shown incorporated into front axle 133. The front axle 133 and the rear axle 122 may be of a similar configuration.

Electric machines 120, 120a, 135, and 135a may receive electrical power from onboard electrical energy storage device 132. Furthermore, electric machines 120 and 135 may provide a generator function to convert the vehicle's kinetic energy into electrical energy, where the electrical energy may be stored at electric energy storage device 132 for later use by the electric machine 120 and/or 135. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. A third inverter system controller (ISC3) 137 may convert DC current from electric energy storage device 132 to an alternating current used by electric machine 120a. A fourth inverter system controller (ISC4) 148 may convert DC current from electric energy storage device 132 to an alternating current used by electric machine 135a. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, torque vectoring electric machine 120a, energy storage device 132, electric machine 135, torque vectoring electric machine 135a, etc. Control system 14 may receive sensory feedback information from one or more of electric machine 135, electric machine 120, energy storage device 132, etc. Further, control system 14 may send control signals to one or more of electric machine 135, torque vectoring electric machine 135a, electric machine 120, torque vectoring electric machine 120a, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle). As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include an ambient temperature/humidity sensor 198. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust electric machine output and/or the torque vectoring electric machines to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1 shows a tire pressure sensor 197 coupled to wheel 131 and configured to monitor a pressure in a tire of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a motor electronics coolant pump (MECP) 146. MECP 146 may be used to circulate coolant to diffuse heat generated by at least electric machine 120 and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

FIG. 2 is a detailed schematic view of an axle system 200 that includes rear axle 122 (e.g., a driveline). Front axle 133 may be configured similarly for four wheel drive vehicles. The axle shown in FIG. 2 includes electric machine 120 of FIG. 1. Electric machine 120 is coupled to shaft 122b via shaft 216 and open differential 203, or alternatively, planetary gear set 203. Electric machine 120 is also mechanically coupled to shaft 122a via shaft 215 and open differential 202, or alternatively, planetary gear set 202. Torque vectoring electric machine 120a is arranged in parallel with electric machine 120 and torque vectoring electric machine 120a is mechanically coupled to open differentials 202 and 203, or alternatively, planetary gear sets 202 and 203 via shafts 220 and 222. Open differentials or planetary gear sets 202 and 203 are coupled to shafts 220 and 222 via gears 221 and 223. Controller 12 may command propulsive force electric machine 120 in a motor or a generator mode. Controller 12 may also command torque vectoring electric machine 120a in a motor mode to rotate a ring gear in an opposite direction of planet gears to increase torque delivered to one of drive shafts 122a and 122b and to reduce torque delivered to the other of drive shafts 122a and 122b. A speed of torque vectoring electric machine 120a is provided to controller 12 via resolver 250.

Referring now to FIG. 3, an alternative axle system 300 (e.g., a driveline) is shown. In this example, differential 308 receives torque from internal combustion engine 302 via transmission 304. Further, differential 308 may receive torque from electric machine 310. Controller 12 may adjust torque output of electric machine 310 and engine 302. Differential 308 distributes torque to axle half shafts 122b and 122a. Output of electric machine 310 may be adjusted as described herein to reduce vibrations in axle system 300.

Thus, the system of FIGS. 1-3 provides for a vehicle system, comprising: an axle system including a torque vectoring electric machine, a propulsive force electric machine, and two gear sets that couple the torque vectoring electric machine to the propulsive force electric machine; and a controller including executable instructions stored in non-transitory memory to adjust torque output of the torque vectoring electric machine via the controller in according to a speed difference between an actual wheel speed and a speed of the torque vectoring electric machine. The vehicle system further comprises additional instructions to divide the speed of the torque vectoring electric machine by a gear ratio. The vehicle system further comprises additional instructions to adjust a torque output of the propulsive force electric machine responsive to a driver requested wheel torque. The vehicle system includes where the actual wheel speed is a left wheel speed. The vehicle system includes where the actual wheel speed is a right wheel speed.

Referring now to FIG. 4, a block diagram of a control system 400 for a torque vectoring electric machine is shown. A requested torque vectoring electric machine torque is input to summing junction 402. A compensation adjustment is added to the requested torque vectoring electric machine torque at summing junction 402. The compensation adjustment may be described via the following equation:

$$T_{TV,req} = T_{TV,slp} - K_{p1}\left(\frac{\omega_{mot}}{\rho} - \omega_{wheelL}\right) + K_{p2}\left(\frac{\omega_{mot}}{\rho} - \omega_{wheelR}\right)$$

where $T_{TV,req}$ is the requested torque output of the torque vectoring electric machine, $T_{TV,slp}$ is the torque output of the torque vectoring electric machine that is based on wheel slip, $K_{p1}$ is a first proportional gain value (e.g., a real number), $\omega_{mot}$ is speed of the torque vectoring electric machine, $\rho$ is a gear ratio between the torque vectoring electric machine and the axle, $\omega_{wheelL}$ is speed of the left wheel of the axle, and $\omega_{wheelR}$ is speed of the right wheel of the axle. This state feedback is shown in block 414.

The torque vectoring electric machine 404 is commanded to the output of summing junction 402. The torque vectoring electric machine delivers the commanded torque to the one or more gear sets represented by block 406. The gear sets deliver torque from the torque vectoring electric machine so as to provide a torque that is a sum of torque at a first half shaft of the axle and torque at a second half shaft of the axle.

Referring now to FIG. 5, an example method for operating a torque vectoring axle with electrical propulsion power is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world. The method of FIG. 5 is described for a single axle (e.g., a rear axle of a rear wheel drive vehicle), but the method may be applied to both front and rear axles. Further, the method may be applied only to the front axle if the vehicle is a front wheel drive or four wheel drive vehicle. In addition, output of a single electric machine combined with an engine may be adjusted as described herein.

At 502, method 500 judges if the vehicle is activated. Method 500 may judge that the vehicle is activated if a vehicle activation request has been made via a human or autonomous driver. The vehicle activation request may be received via a human/machine interface directly receiving input from a human driver or via a key fob or other device entering a predetermined proximity of the vehicle (e.g., within 5 meters of the vehicle). If vehicle activation has been requested and vehicle systems are activated, the answer is yes and method 500 proceeds to 504. Otherwise, method 500 proceeds to 540.

At 540, method 500 deactivates the torque vectoring electric machine and one or more electrical propulsion machines. The electric machines are deactivated to conserve electrical power. Deactivating the electric machines may include deactivating one or more inverters that supply or receive electrical power from the electric machines. The electric machines and the inverters may be deactivated via ceasing to supply electrical power to the electric machines and the inverters. In one example, a power contactor of an electric energy storage device is open circuited when the vehicle is deactivated. Method 500 proceeds to exit.

At 504, method 500 determines driver demand wheel torque (alternately may be referred to a requested wheel torque) and applies the driver demand wheel torque to vehicle wheels. In one example, driver demand torque is determined based on accelerator pedal position and vehicle speed. In particular, accelerator pedal position and vehicle speed reference or index a table of empirically determined driver demand wheel torque values. The table outputs a unique driver demand wheel torque that is looked up via the accelerator pedal position and the vehicle speed to one or more propulsive force electric machines. Method 500 proceeds to 506 after determining the driver demand wheel torque.

At 506, method 500 judges whether or not wheel slip of one or more driven wheels (e.g., wheels driven by a propulsive force electric machine) is present. In one example, speed of each wheel is compared to a natural speed of the wheel (e.g., a speed of the wheel under similar circumstances where the wheel is not slipping) to determine if wheel slip is present. Alternatively, speed of the wheel may be compared to the speed of the vehicle to determine if wheel slip is present. If method 500 judges that wheel slip of a driven wheel is present, the answer is yes and method 500 proceeds to 508. Otherwise, the answer is no and method 500 proceeds to exit.

At 508, method 500 determines a torque output of the torque vectoring electric machine this is based on wheel slip $T_{TV,slp}$. In one example, $T_{TV,slp}$ is based on wheel slip and wheel slip is determined from natural wheel slip. A natural speed of a wheel may be determined or estimated via adjusting a reference speed of the vehicle according to steering angle and the rolling radius of the wheel. The rolling radius of the wheel is a radius from the center of the wheel to where the wheel's tire contacts the ground or road. For example, the natural speed of a left wheel may be determined via the following equation:

$$NWS_L = \frac{1}{2 \cdot \pi \cdot rr_L}\left(\frac{rev}{kilometer}\right) \cdot V_{ref}\left(\frac{kilometers}{hr}\right) \cdot \alpha_{Adj\_L}$$

where $NWS_L$ is the natural wheel speed for the left driven wheel, $rr_L$ is the rolling radius of the left driven wheel, $V_{ref}$ is the vehicle reference speed, and $\alpha_{Adj\_L}$ is an empirically determined adjustment factor for the left driven wheel that provides compensation for the steering wheel angle. In one example, the value of $\alpha_{Adj\_L}$ is output from a table that is referenced via yaw rate or via steering angle and vehicle speed. The vehicle reference speed may be determined via the vehicle's wheel speed sensors and a longitudinal accelerometer as known in the art. In one example, the vehicle reference speed may be determined directly from wheel speed sensor output when the absolute value of wheel acceleration is less than a threshold, where the threshold is vehicle acceleration as indicted by an accelerometer. However, if the absolute value of wheel acceleration is greater than the threshold value, then a most recent vehicle reference speed that was derived from wheel speed sensor output may be adjusted responsive to acceleration of the vehicle as determined via an accelerometer. Values for $\alpha_{Adj\_L}$ may be determined via driving the vehicle on a skid pad with the steering wheel adjusted to a fixed angle. Adjustment factor values in the table may be increased or decreased such that the natural speed of the particular wheel is equal to the reference vehicle speed. The vehicle reference speed may be determined via a global positioning system or a fifth wheel when values in the $\alpha_{Adj\_L}$ table are being adjusted. Natural wheel speeds for the right wheel may be determined in a similar way. Further, if the vehicle includes two driven axles, left and right natural wheel speeds for the second driven axle may be determined in a similar way. It should be noted that natural speeds of the driven wheels may be determined in other known ways including empirically or via vehicle suspension kinematics and vehicle geometry.

Method 500 also determines a speed difference between driven wheels (WS) and the natural wheel speed of the wheel (NWS). The speed difference may be expressed as:

Speed_dif=WS−NWS where Speed_dif is the speed difference value, WS is wheel speed, and NWS is the natural wheel speed of the wheel. Speed differences may be determined for both the left driven wheel and the right driven wheel. Speeds of both driven wheels are determined from wheel speed sensors. Method 500 determines a torque output of the torque vectoring electric machine this is based on wheel slip $T_{TV,slp}$. In particular, the torque output of the torque vectoring electric machine this is based on wheel slip $T_{TV,slp}$ may be determined according to the following equation:

$$T_{TV,slp} = K_p \cdot \frac{d(\text{Speed\_dif})}{dt} + T_0$$

where $T_{TV,slp}$ is the torque output of the torque vectoring electric machine this is based on wheel slip, $K_p$ is a proportional gain (e.g., a scalar or a real number), Speed_dif is the wheel speed difference, d(Speed_dif)/dt is the derivative of the wheel speed difference, and $T_0$ is a predetermined value of a real number. The values of $K_p$ and $T_0$ may be determined via entering the vehicle into a turn and incrementally adjusting the values. Method 500 proceeds to 510.

At 510, method 500 determines a speed of the torque vectoring electric machine. In one example, speed of the torque vectoring machine may be determined via a resolver. Method 500 proceeds to 512.

At 512, method 500 adjusts torque of the torque vectoring electric machine responsive to a speed difference between a speed of the torque vectoring electric machine and wheel speed. In one example, as previously mentioned, the torque vectoring electric machine torque adjustment may be described via the following equation:

$$T_{TV,req} = T_{TV,slp} - K_{p1}\left(\frac{\omega_{mot}}{\rho} - \omega_{wheelL}\right) + K_{p2}\left(\frac{\omega_{mot}}{\rho} - \omega_{wheelR}\right)$$

where $T_{TV,req}$ is the requested torque output of the torque vectoring electric machine, $T_{TV,slp}$ is the torque output of the torque vectoring electric machine that is based on wheel slip, $K_{p1}$ is a first proportional gain value (e.g., a real number), $\omega_{mot}$ not is speed of the torque vectoring electric machine, $\rho$ is a gear ratio between the torque vectoring electric machine and the axle, $\omega_{wheelL}$ is speed of the left wheel of the axle, and $\omega_{wheelR}$ is speed of the right wheel of the axle. The torque vectoring electric machine outputs the torque $T_{TV,req}$. Method 500 proceeds to exit.

In this way, torque output by the torque vectoring electric machine may be adjusted to reduce vibrations in the axle that may be due to resonance. Torque output of the torque vectoring machine may compensate for resonance in the left and right half shafts of a driven axle.

Thus, the method of FIG. 5 provides for a vehicle operating method, comprising: adjusting torque output of a torque vectoring electric machine via a controller in according to a speed difference between an actual wheel speed and a speed of the torque vectoring electric machine. The method includes where the actual wheel speed is determined via a wheel speed sensor. The method includes where the torque vectoring electric machine speed is determined via a resolver. The method further comprises dividing the speed of the torque vectoring electric machine by a gear ratio. The method includes where the torque vectoring electric machine is arranged in parallel with a propulsive force electric machine. The method further comprises adjusting torque output of the propulsive force electric machine based on a requested wheel torque. The method further comprises delivering torque output of the torque vectoring electric machine to an open differential or a planetary gear set. The method further comprises deactivating the torque vectoring electric machine when wheel slip is not detected.

The method of FIG. 5 also provides for a vehicle operating method, comprising: adjusting torque output of a torque vectoring electric machine via a controller according to a speed difference between an actual left wheel speed and a speed of the torque vectoring electric machine. The method further comprises adjusting torque output of the torque vectoring electric machine via the controller according to a speed difference between an actual right wheel speed and the speed of the torque vectoring electric machine. The method further comprises dividing the speed of the torque vectoring electric machine by a gear ratio. The method further comprises activating the torque vectoring electric machine in response to wheel slip. The method further comprises multiplying the speed difference between an actual left wheel speed and a speed of the torque vectoring electric machine by a proportional gain factor. The method further comprises adjusting a torque of a propulsive electric machine responsive to a driver demand wheel torque. The method includes where the propulsive electric machine is coupled to the torque vectoring electric machine via two gear sets that are spaced apart along an axle.

Referring now to FIG. 6, a prophetic operating sequence according to the method of FIG. 5 is shown. The vehicle operating sequence shown in FIG. 6 may be provided via the method of FIG. 5 in cooperation with the systems shown in FIGS. 1-3. The plots shown in FIG. 6 occur at the same time and are aligned in time. In this example, the driver demand wheel torque is constant and not shown throughout the sequence.

The first plot from the top of FIG. 6 is a plot of vehicle turning direction versus time. The vertical axis represents vehicle turning direction and the vehicle is turning right when trace 602 is at a higher level near the vertical axis arrow that is pointing upward. The vehicle is turning left when trace 602 is at a lower level near the vertical axis arrow that is pointing downward. The vehicle is not turning when trace 602 is at the level of the horizontal axis. The horizontal axis represents time and time increases from the left side of the figure to the right side of the figure. Trace 602 represents the vehicle turning direction.

The second plot from the top of FIG. 6 is a plot of right wheel slip versus time. The vertical axis represents right wheel slip and the amount of wheel slip increases in the direction of the vertical axis arrow. The horizontal axis represents time and time increases from the left side of the figure to the right side of the figure. Trace 604 represents right wheel slip. Wheel slip is zero when trace 604 is near the horizontal axis.

The third plot from the top of FIG. 6 is a plot of left wheel slip versus time. The vertical axis represents left wheel slip and the amount of wheel slip increases in the direction of the vertical axis arrow. The horizontal axis represents time and time increases from the left side of the figure to the right side of the figure. Trace 606 represents right wheel slip. Wheel slip is zero when trace 606 is near the horizontal axis.

The fourth plot from the top of FIG. 6 is a plot of right wheel torque versus time. The vertical axis represents right wheel torque and right wheel torque increases in the direction of the vertical axis arrow. The horizontal axis represents time and time increases from the left side of the figure to the right side of the figure. Trace 608 represents right wheel torque.

The fifth plot from the top of FIG. 6 is a plot of left wheel torque versus time. The vertical axis represents left wheel torque and left wheel torque increases in the direction of the vertical axis arrow. The horizontal axis represents time and time increases from the left side of the figure to the right side of the figure. Trace 610 represents left wheel torque.

The sixth plot from the top of FIG. 6 is a plot of torque vectoring electric machine operating state versus time. The vertical axis represents torque vectoring electric machine operating state and the torque vectoring electric machine is activated when trace 612 is at a higher level near the vertical axis arrow. The torque vectoring electric machine is not activated when trace 612 is at a lower level near the horizontal axis.

At time t0, the vehicle is not turning and the right and left wheels are not slipping. A middle level of torque is delivered to the right wheel and left wheel according to the driver demand torque (not shown). The torque vectoring electric machine is not activated.

At time t1, the vehicle begins to turn right and the right wheel begins to slip shortly thereafter. The torque vectoring electric machine is activated and begins transferring torque from the right wheel to the left wheel shortly after the right wheel slip is detected. The right wheel torque amount is reduced and the left wheel torque amount is increased shortly after time t1 via adjusting torque output of the torque vectoring electric machine (not shown). Output of the torque vectoring electric machine is also adjusted to compensate for driveline or axle system resonance. In particular, the torque output of the torque vectoring electric machine is adjusted according to a speed difference between a wheel speed and a speed of the torque vectoring electric machine.

At time t2, the vehicle exits to right turn and the right wheel slip is reduced to zero shortly thereafter. The torque vectoring electric machine is deactivated to conserve electrical energy and the right and left wheel torques are equalized via reducing torque output of the torque vectoring electric machine to zero (not shown).

At time t3, the vehicle begins to turn left and the left wheel begins to slip shortly thereafter. The torque vectoring electric machine is activated and begins transferring torque from the left wheel to the right wheel shortly after the left wheel slip amount is detected. The left wheel torque amount is reduced and the right wheel torque amount is increased shortly after time t3 via adjusting torque output of the torque vectoring electric machine (not shown).

At time t4, the vehicle exits to left turn and the left wheel slip is reduced to zero shortly thereafter. The torque vectoring electric machine is deactivated to conserve electrical energy and the right and left wheel torques are equalized via reducing torque output of the torque vectoring electric machine to zero (not shown).

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
adjusting torque output of a torque vectoring electric machine via a controller according to a speed difference between a wheel speed determined via a wheel speed sensor and a speed of the torque vectoring electric machine.

2. The method of claim 1, where the actual wheel speed is determined via a wheel speed sensor.

3. The method of claim 1, where the torque vectoring electric machine speed is determined via a resolver.

4. The method of claim 1, further comprising dividing the speed of the torque vectoring electric machine by a gear ratio.

5. The method of claim 1, where the torque vectoring electric machine is arranged in parallel with a propulsive force electric machine.

6. The method of claim 5, further comprising adjusting torque output of the propulsive force electric machine based on a requested wheel torque.

7. The method of claim 1, further comprising delivering torque output of the torque vectoring electric machine to an open differential or a planetary gear set.

8. The method of claim 1, further comprising deactivating the torque vectoring electric machine when wheel slip is not detected.

9. A vehicle operating method, comprising:
adjusting torque output of a torque vectoring electric machine via a controller according to a speed difference between a left wheel speed determined via a wheel speed sensor and a speed of the torque vectoring electric machine.

10. The method of claim 9, further comprising adjusting torque output of the torque vectoring electric machine via the controller according to a speed difference between an actual right wheel speed and the speed of the torque vectoring electric machine.

11. The method of claim 10, further comprising dividing the speed of the torque vectoring electric machine by a gear ratio.

12. The method of claim 11, further comprising activating the torque vectoring electric machine in response to wheel slip.

13. The method of claim 12, further comprising multiplying the speed difference between an actual left wheel speed and a speed of the torque vectoring electric machine by a proportional gain factor.

14. The method of claim 9, further comprising adjusting a torque of a propulsive electric machine responsive to a driver demand wheel torque.

15. The method of claim 14, where the propulsive electric machine is coupled to the torque vectoring electric machine via two gear sets that are spaced apart along an axle.

* * * * *